E. FONGEALLAZ.
SECTIONAL BOLT.
APPLICATION FILED OCT. 23, 1908.
948,559.
Patented Feb. 8, 1910.
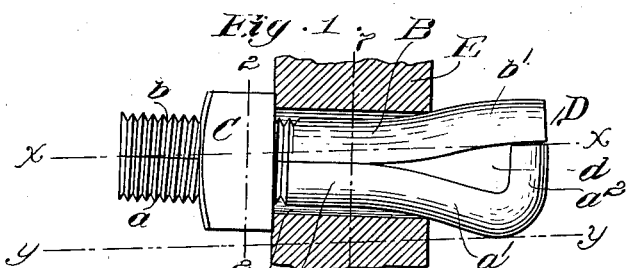
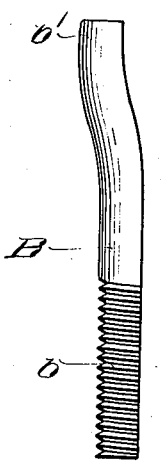 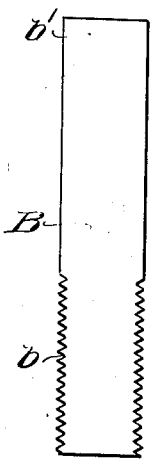 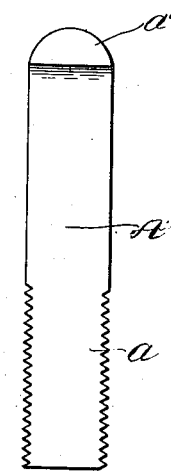 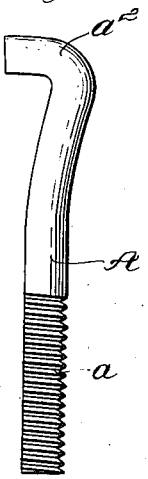
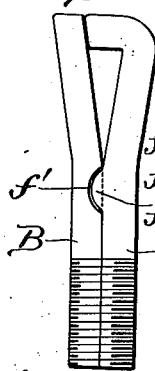 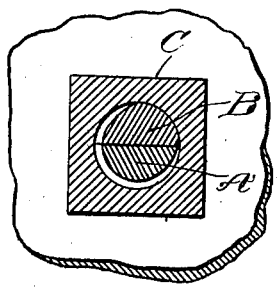 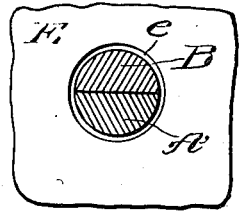
Witnesses:
Anna B. Lindsay
Mary O'Brien
Inventor:
Eugene Fongeallaz
by Joseph T. Brennan Atty

UNITED STATES PATENT OFFICE.

EUGENE FONGEALLAZ, OF NORWOOD, MASSACHUSETTS, ASSIGNOR OF FIFTY-ONE ONE-HUNDREDTHS TO EDWARD C. WRIGHT, GEORGE R. UNDERWOOD, GEORGE TENNEY, EUGENE M. WATERS, AND CHAUNCEY P. FENTON, OF BOSTON, MASSACHUSETTS.

SECTIONAL BOLT.

948,559.   Specification of Letters Patent.   Patented Feb. 8, 1910.

Application filed October 23, 1908. Serial No. 459,257.

*To all whom it may concern:*

Be it known that I, EUGENE FONGEALLAZ, of Norwood, in the county of Norfolk and State of Massachusetts, have invented a new and useful Improvement in Sectional Bolts, of which the following is a specification.

My invention relates to bolts and particularly to sectional bolts for use in structural iron work, bridges, ship building and the like where a simple and strong bolt is required, although it will be clear from the following description that my improved bolt is not limited in this respect and can be used generally in situations where it is desired to securely bolt two or more things together.

As is well known, the bolts carrying a screw-threaded nut now commonly used will in time become loose and the nut will be gradually loosened or worked off the bolt by vibration of the structure in which the bolt is inserted. This defect is one which can be obviated by the use of my improved sectional bolt. Another disadvantage of using the common style of headed bolt is, when securing parts of large structures together, if the two ends of the bolt hole be so far apart that one workman cannot reach around the structure to insert a bolt in the hole with one hand and, at the same time, secure a nut upon the threaded end of the bolt with the other hand, it is necessary to employ two workmen to do the bolting one on each side, thus adding to the expense and labor of construction. With the use of my improved sectional bolt, this expense and trouble is avoided and one workman can do the work as quickly and efficiently as has heretofore been done by two.

The object of my invention is to provide a sectional bolt of simple, inexpensive and strong construction which may be quickly applied and secured to a structure by a single workman, operating wholly from one side of the structure, and to provide a bolt of this kind which will be so constructed as to positively hold the nut against working loose on the bolt through vibration.

My improved sectional bolt consists of a plurality of bars so shaped as to produce a cylindrical shank when assembled side by side. The bars are threaded at their outer ends to receive a nut and at their inner ends they diverge so as to leave a space between said inner ends, and thus provide a tapered head to engage the structure where it surrounds the inner end of the bolt hole. In the preferred form of my invention a strut is also provided for holding the inner separated extremities of the bars apart and locking them against rotary movement when assembled. This strut is provided by bending inwardly the inner end of one of the bars.

Referring to the accompanying drawings:—Figure 1 shows the preferred form of my improved bolt in side elevation as it appears when in place in a structure; Fig. 2 is a section on line 2—2 of Fig. 1; Figs. 3 and 4 are two elevations of one of the half-round bolt sections; Figs. 5 and 6 are two elevations of the other half round bolt section; Fig. 7 is a section on line 7—7 of Fig. 1; Fig. 8 shows another form of my invention; and Fig. 9 is a section on line 9—9 of Fig. 8.

Having reference to the drawings A represents one of the bolt sections; B the other bolt section, and C the nut. The bolt sections A and B are half round bars (see Fig. 7) threaded at their outer ends as at $a$, $b$, so that when brought together as in Figs. 1 and 7 they make up a threaded bolt which is cylindrical, except at its inner end where the two bars A and B are spread apart or diverge as at $a'$ and $b'$ to form a wedge-shaped head D having an interior space $d$. At its inner extremity the bar A is bent inwardly so as to provide a strut $a^2$ which bears against the bar B.

In applying my improved bolt the usual cylindrical bolt hole $e$ is made in the structure E and then the bolt section A is inserted into bolt hole $e$ with strut $a^2$ in advance until the strut $a^2$ is well beyond the inner side of structure E. Then the bolt section B is inserted into bolt hole $e$, alongside of section A, its inner extremity overlapping and engaging strut $a^2$ as shown in Fig. 1. The nut C is then applied and tightened upon the outer screw threaded end of the bolt thus assembled. As the head D is forcibly drawn partly into the inner end of bolt hole $e$ by the tightening of the nut the structure and the bolt score each other which together with the compressing of head D as the bolt is drawn outwardly by the nut C, acts not only to prevent rotation of the bolt with the nut but also to establish a constant back pressure or pull by head D, which prevents the nut from being jarred loose afterward by vibrations of structure E.

In Figs. 8 and 9 I have shown another form of my invention wherein the shank portion of the bar A is provided with ears or lugs $f$, adapted to embrace the shank portion of the other bar B, so as to hold the two bars against lateral displacement. The bar B, where it is engaged by the lugs $f$, is made with sockets or recesses $f'$ to receive the lugs $f$, so that when the two parts of the bolt are together they are locked against endwise displacement also. These lugs and sockets are preferably located near the inner end of the shank portions of the bars so that when the nut is applied and screwed up tight the inner ends of the two bars are held against displacement by lugs $f, f$. These lugs also serve to match up the screw threads $a$ and $b$ when the bolt is assembled.

I am aware that two part bolts are old, but so far as I know I am the first to produce a bolt of this class which can be inserted in a cylindrical bolt hole entirely from one side of the structure which is being bolted together. So long as the extent of divergence of the inner ends of bolt sections A and B is properly proportioned with relation to the length of the bolt hole, and so long as the length of strut $a^2$ is proportioned so that the distance between the two dot-and-dash lines $x$—$x$ and $y$—$y$ is not greater than the diameter of the bolt hole, then my improved bolt may be made for bolt holes of any desired length which is a capacity also wholly new in a bolt of this class.

What I claim is:—

1. An improved sectional bolt comprising two bars, said bars being adapted at their outer ends to receive a nut or the like and being spread apart at their inner ends to form a head, with the extremity of one of said bars bent inwardly toward the inner end of the other to provide a separating strut.

2. An improved sectional bolt comprising two bars each half round in cross-section, said bars being adapted at their outer ends to receive a nut or the like, and being spread apart at their inner ends to form a beveled head, and a strut for holding the inner ends of said bars apart and preventing their rotation with respect to each other.

3. An improved sectional bolt comprising two bars adapted to form the shank and head of the bolt when assembled, one of said bars having its shank portion bent outwardly and inwardly forming a strut approximately of the same length as the diameter of the bolt hole into which it is to be inserted, and the other of said bars having its shank bent outwardly, whereby when the two bars are assembled within the bolt hole they cannot be withdrawn either before or after the nut or other fastening means is secured to their outer ends.

EUGENE FONGEALLAZ.

Witnesses:
 FRANCES G. CONNOR,
 RALPH HAYCOCK.